(12) United States Patent
Zhang et al.

(10) Patent No.: US 8,486,271 B2
(45) Date of Patent: Jul. 16, 2013

(54) ENVIRONMENTALLY-FRIENDLY CEMENTITIOUS ARTICLES, FORMULATIONS, METHODS OF MAKING AND USES

(75) Inventors: Huagang Zhang, Rancho Cucamonga, CA (US); Lijun Mao, Rancho Cucamonga, CA (US); Paul Owen Kramer, Rancho Cucamonga, CA (US); Caidian Luo, Alta Loma, CA (US); Ryan Matthew Sullivan, Chicago, IL (US); John Andrew Joecken, Palm Springs, CA (US); Marko Suput, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 12/814,377

(22) Filed: Jun. 11, 2010

(65) Prior Publication Data

US 2010/0326327 A1 Dec. 30, 2010

Related U.S. Application Data

(60) Provisional application No. 61/220,934, filed on Jun. 26, 2009.

(51) Int. Cl.
| | | |
|---|---|---|
| *C02F 1/42* | (2006.01) | |
| *G21F 9/04* | (2006.01) | |
| *C04B 7/00* | (2006.01) | |
| *C04B 9/12* | (2006.01) | |
| *C04B 28/00* | (2006.01) | |
| *C04B 28/04* | (2006.01) | |

(52) U.S. Cl.
USPC ............................ 210/681; 210/687; 106/713

(58) Field of Classification Search
USPC ................................... 210/681, 687; 106/713
See application file for complete search history.

(56) References Cited

U.S. PATENT DOCUMENTS

| | | | |
|---|---|---|---|
| 4,190,456 A | 2/1980 | Absolon et al. | |
| 4,362,626 A | 12/1982 | Takeuchi et al. | |
| 6,241,893 B1 | 6/2001 | Levy | |

(Continued)

OTHER PUBLICATIONS

"Deionized Water". Cal Water. Nov. 6, 2004 [Retrieved on Feb. 8, 2012]. Retrieved from http://web.archive.org/web/20041106063402/http://www.cal-water.com/pdf/DI_in_a_NutShell.pdf.*

(Continued)

*Primary Examiner* — Kaj K Olsen
*Assistant Examiner* — Karam Hijji
(74) *Attorney, Agent, or Firm* — Knobbe Martens Olson & Bear, LLP (57) ABSTRACT

Described herein is a cementitious article and a method of making using a water-based manufacturing system that incorporates a closed-loop or partially closed loop water recycling system and an alkali removal process. The system, as such is environmentally friendly, saves resources, such as water and other raw materials, and reduces waste disposal. The system further provides for a cementitious article having a low alkali content. Articles prepared by one or more processes described herein have characteristics that include a low apparent density, high strength and high freeze-thaw performance as compared with an article of the same general formulation but made from a comparative manufacturing system that does not include an alkali removal process. Articles described herein are suitable for use as building products, such as siding, the underlayment panel, board, trim, fascia, roofing, decking, and fence.

9 Claims, 7 Drawing Sheets

U.S. PATENT DOCUMENTS

| | | |
|---|---|---|
| 6,929,748 B2 | 8/2005 | Avijit et al. |
| 7,148,270 B2 | 12/2006 | Bowe |
| 7,314,568 B2 | 1/2008 | Shay |
| 2006/0025312 A1* | 2/2006 | Santra et al. ............ 507/269 |
| 2006/0293417 A1 | 12/2006 | Taniguchi et al. |

OTHER PUBLICATIONS

Hills, Linda; Johansen, Vagn. "Hexavalent Chromium in Cement Manufacturing: Literature Review". Portland Cement Association. 2007 [Retrieved on Feb. 8, 2012]. Retrieved from http://stuff.mit.edu/afs/athena/dept/cron/project/concrete-sustainability-hub/Literature%20Review/Building%20Energy/Concerte%20Industry%20Reports/Literature%20Review%20Example.p.*

"Use of Recycled Water in Concrete Production". Cement, Concrete, & Aggregates Australia. Aug. 2007 [Retrieved on Feb. 8, 2012]. Retrieved from http://www.concrete.net.au/publications/pdf/RecycledWater.pdf.*

Chini, S. Abdol; Mbwambo, William. "Environmentally Friendly Solutions for the Disposal of Concrete Wash Water From Ready Mixed Concrete Operations". University of Florida. 1996 [Retrieved on Feb. 7, 2012]. Retrieved from http://infohouse.p2ric.org/ref/06/05817.pdf.*

"Ion Exchange". Remco Engineering. Oct. 25, 2007 [Retrieved on Feb. 8, 2012]. Retrieved from http://web.archive.org/web/20071025034958/http://www.remco.com/ix.htm.*

"Demineralization". GC3. May 19, 2006 [Retrieved on Sep. 18, 2012]. Retrieved from http://web.archive.org/web/20080203191018/http://www.gc3.com/techdb/manual/dminfs.htm.*

International Search Report and Written Opinion dated Sep. 7, 2010 for PCT/US2010/38524.

International Preliminary Report on Patentabilility dated Jan. 4, 2012 for PCT/US2010/38524.

* cited by examiner

ENVIRONMENTALLY-FRIENDLY CEMENTITIOUS ARTICLES, FORMULATIONS, METHODS OF MAKING AND USES

CROSS-REFERENCE TO RELATED APPLICATIONS

This application claims the benefit of priority under 35 U.S.C. §119(e) of U.S. Provisional Application No. 61/220,934 filed on Jun. 26, 2009, the entirety of which is incorporated herein by reference.

BACKGROUND OF THE INVENTION

1. Field of the Invention

The present disclosure relates generally to fiber cement manufacturing, and more particularly, to systems and methods for reducing water usage in fiber cement manufacturing processes.

2. Description of the Related Art

Commercial fiber reinforced cementitious shaped articles, such as fiber cement building panels and exterior sidings, are usually manufactured using large scale cementitious forming processes. These large scale operations, such as industrial-size Hatschek process, typically require the use of millions of gallons of water as a process aid. While some efforts have been made to recycle and reuse the large volume of process water in fiber cement manufacturing, the efforts have been largely limited to installing filtration systems to remove particulates from the spent water or adjusting pH of the water for discharge. The recycled process water typically has high alkali content because cement continues to leach alkali during the cementitious forming process. As such, when the process water is reused, the alkali metal ions in the water can accumulate and detrimentally affect product properties.

Ion exchange systems have been used to treat water in both industrial and household applications to remove ions from water. For example, ion exchangers have been used in household water purification systems and in industrial applications such as desalination of sea water and removal of metals from plating solutions in semiconductor processing. However, conventional ion exchange systems are not equipped to handle, treat, and maintain a closed-loop circulation of the extremely high volume of process water with complex chemical make-up required in fiber cement manufacturing. Moreover, conventional ion exchange systems are not designed to treat extremely complex spent water from cementitious forming processes in a manner such that the treated water can provide enhanced functional properties to the final product. In view of the foregoing, there remains a need for improved systems and methods for reducing water usage in large scale fiber cement manufacturing processes.

SUMMARY OF THE INVENTION

Although making and using various embodiments are discussed in detail below, it should be appreciated that as described herein are provided many inventive concepts that may be embodied in a wide variety of contexts. Embodiments discussed herein are merely illustrative ways to make and use the invention, and do not limit the scope of the invention.

The preferred embodiments of the present invention provide a closed-loop system and method of treating spent process water in a large scale cementitious shaped article manufacturing process utilizing the Hatschek process, flow-on, moulding, mazza pipe, or the like. The cementitious articles made from the novel manufacturing system may be of a pre-formed shape such as a board, sheet, or panel. The articles may be used as a building product, useful as, for example, tile underlayment, siding, panel, trim, fascia, roofing, crown molding, decking, and fence. In addition to conserving water and chemicals, the preferred embodiments of the present invention provide fiber cement articles with unexpected, enhanced functional properties, including but not limited to, enhanced strength and durability, particularly after undergoing freeze-thaw conditions.

In one aspect, the preferred embodiments of the present invention provide a method of recycling process water from a cementitious forming process. The method comprises removing calcium, sodium, or potassium ions from the process water to provide a process water with a reduced metal ion content. The method further comprises adding calcium to the process water to produce a calcium enriched process water with a reduced metal ion content, and reintroducing at least a portion of the calcium enriched process water with a reduced metal ion content into the cementitious forming process. In one embodiment, the calcium, sodium, and/or potassium ions are removed from the process water by an ion exchange process. Preferably, the ion exchange process comprises a first ion exchange resin having a weak acid functional group and a second ion exchange resin having a strong acid functional group. In one implementation, the weak functional group is —$CO_2H$ and the strong acid functional group is —$SO_3H$.

In another aspect, the preferred embodiments of the present invention provide a cementitious shaped article manufacturing process. The process comprises a forming unit adapted to form a cementitious shaped article and a closed-loop water treatment system utilizing a plurality of ion exchangers. The forming process discharges spent process water containing calcium, sodium, and potassium ions. The ion exchangers are adapted to remove at least one of the ions present in the spent process water. In one embodiment, at least one of the ion exchangers in the closed-loop water treatment system is adapted to remove calcium ions from the process water. In another embodiment, the ion exchangers are sequentially arranged such that the ion exchangers are adapted to first remove multivalent ions before removing monovalent ions. In some embodiments, cation resins are used to remove anions such as $SO_4^{2-}$ and $Cl^-$ from the process water. In some other embodiments, the process comprises at least one ion exchanger adapted to add calcium back to the process water after calcium ions have been removed by another ion exchanger.

In yet another aspect, the preferred embodiments of the present invention provide a system for manufacturing a cementitious building article. The system comprises a forming process and an alkali removal process incorporating a partially closed-loop water recycling system. Preferably, the alkali removal process comprises at least two sets of ion exchangers operating in parallel. Preferably, the forming process is in cooperation with the alkali removal process such that at least a portion of the water exiting the forming process is recycled through the alkali removal process which results in process water having a reduced alkali content. In one embodiment, the alkali removal process is adapted to receive water discharged from the forming process at a flow rate of about 8,000 to 150,000 gallons per hour.

In yet another aspect, the preferred embodiments of the present invention provide a cementitious shaped article prepared by a cementitious forming process carried out in the presence of water which has been recycled according to the methods and systems described herein. In one embodiment, the cementitious shaped article is a fiber cement building panel or siding formed by a Hatschek process using recycled process water having a reduced alkali content and an enriched calcium ion content. The cementitious shaped article thus formed has a higher MOR and tensile strength, particularly after undergoing freeze-thaw conditions, than an equivalent article formed by a comparative manufacturing process that does not use recycled process water having a reduced alkali content and/or enriched calcium ion content.

BRIEF DESCRIPTION OF THE DRAWINGS

The drawing figures are not necessarily to scale and certain features may be shown exaggerated in scale or in somewhat generalized or schematic form in the interest of clarity and conciseness.

DETAILED DESCRIPTION OF THE PREFERRED EMBODIMENT

Figure 1:
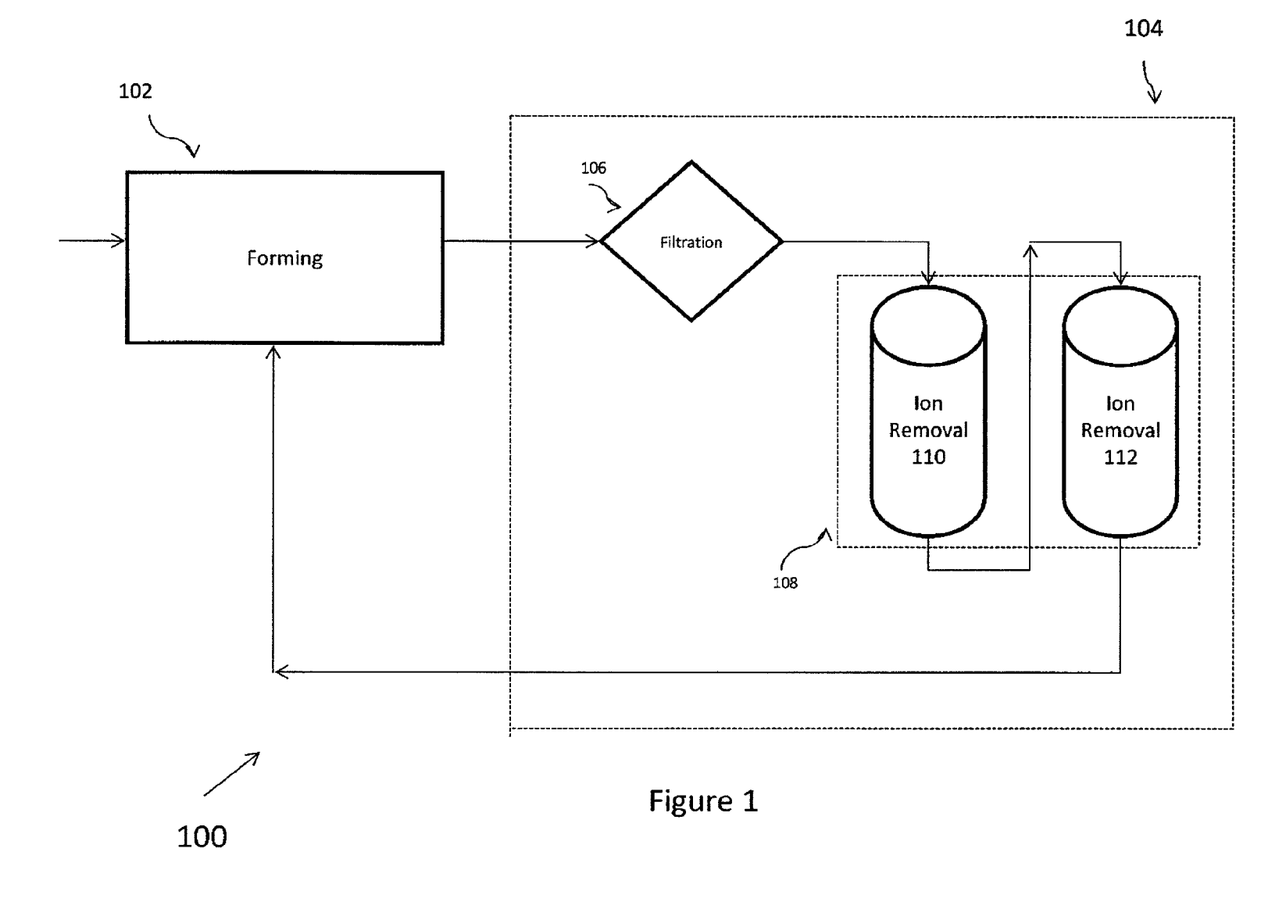
FIG. 1 provides a general schematic illustration of a fiber cement manufacturing process of one preferred embodiment which incorporates a closed-loop process water recycle and treatment system.

FIG. 1 schematically illustrates a fiber cement manufacturing system 100 of one preferred embodiment, which incorporates a novel closed-loop spent water recycle and treatment process that reduces water and chemical usage, and also enhances the functionality of the formed product. As shown in FIG. 1, the system 100 generally comprises a forming unit 102 adapted to form a fiber cement shaped article, and a closed-loop water treatment system 104 adapted to treat at least a portion of the spent process water and recirculate the treated process water back to the forming unit 102. The forming unit 102 may include Hatschek, Magnani process, flow-on, or any other water based fiber cement forming processes known in the art. In some embodiments, the forming unit 102 comprises one or more slurry vats, a running felt, a formation cylinder and a conveyer.

As further shown in FIG. 1, the closed-loop water treatment system 104 comprises a filtration device 106 and a multistage alkali removal system 108. In one embodiment, the filtration device 106 is designed to remove residues, such as fine particulate matters, fibers, aggregates, from the process water before alkali treatment, thus preventing blockage and increases usage time of the alkali treatment steps. In one implementation, the filtration device 106 comprises multiple filtration units in series, which may have capabilities to screen different sizes of residue and process water. The filtration units are, in some embodiments, arranged sequentially in series so that larger particulate matters are removed before finer ones. The sequence helps distribute the particle loading across the units. A filtration unit may be a strainer, screen, disk filter, bag filter, sand filter, cartridge filter, or similar.

The multistage alkali removal system 108, which receives the spent process water after filtration, is specifically designed to remove harmful ions from the water while retaining useful ions that may enhance product functionality. Because cementitious forming processes are usually conducted in a highly alkaline environment, the spent process water usually has high alkali content and contains a large amount of monovalent and multivalent ions. Specifically, the inventor has found that the presence of certain monovalent ions, such as $Na^+$ and $K^+$, in the spent process water could have damaging effects on the product if the water is reused. In the same token, the inventor has found that the presence of certain multivalent ions such as $Ca^{2+}$ in the water can have a surprisingly positive effect on product functionality and performance. Thus, the multistage alkali removal system 108 is preferably designed to selectively remove certain monovalent ions, such as $Na^+$ and $K^+$, so that the treated process water has a reduced alkali content and contains a minimal level of $Na^+$ and $K^+$ but a high level of $Ca^{2+}$. In some embodiments, the multistage alkali removal system 108 is also designed to selectively remove chromium (Cr).

As shown in FIG. 1, the multistage alkali removal system 108 generally includes an ion removal step 110 and 112. In some embodiments, the multistage alkali removal system 108 preferably comprises a series of ion exchanger units that are configured in a sequential order such that through the ion removal step, multivalent ions, such as $Ca^{+2}$, Cr(VI), are removed before monovalent ions, such as $K^+$ and $Na^+$. Subsequent to the removal of these ions, certain multivalent ions such as $Ca^{+2}$ are then added back to the process water before it is reused in the forming process. The multivalent ions are first removed in order to facilitate removal of the monovalent ions, otherwise the multivalent ions will likely saturate the resin bed and prevent effective removal of the monovalent ions.

The alkali removal system generally operates by stoichiometric and chemically reversible reactions between alkali ions in the spent process water and acidic ions within the ion exchanger units which form a salt. The ion exchanger units comprise one or more synthetic resins placed in series or in parallel to which acidic ions are bound on the active sites of the resin. Synthetic resins include cation exchange resins for removal of alkali cations and may also include anion exchange resins for removal of one or more anions. Examples of suitable synthetic resins include but are not limited to polystyrenic gel, polystyrene cross-linked with divinylbenzene, or long chain polymeric beads with carboxylic or sulfuric acid functional groups. In some embodiments, each set of ion exchangers may include at least one exchanger having a weak acid functional group and at least one exchanger having a strong acid functional group.

Figure 2:
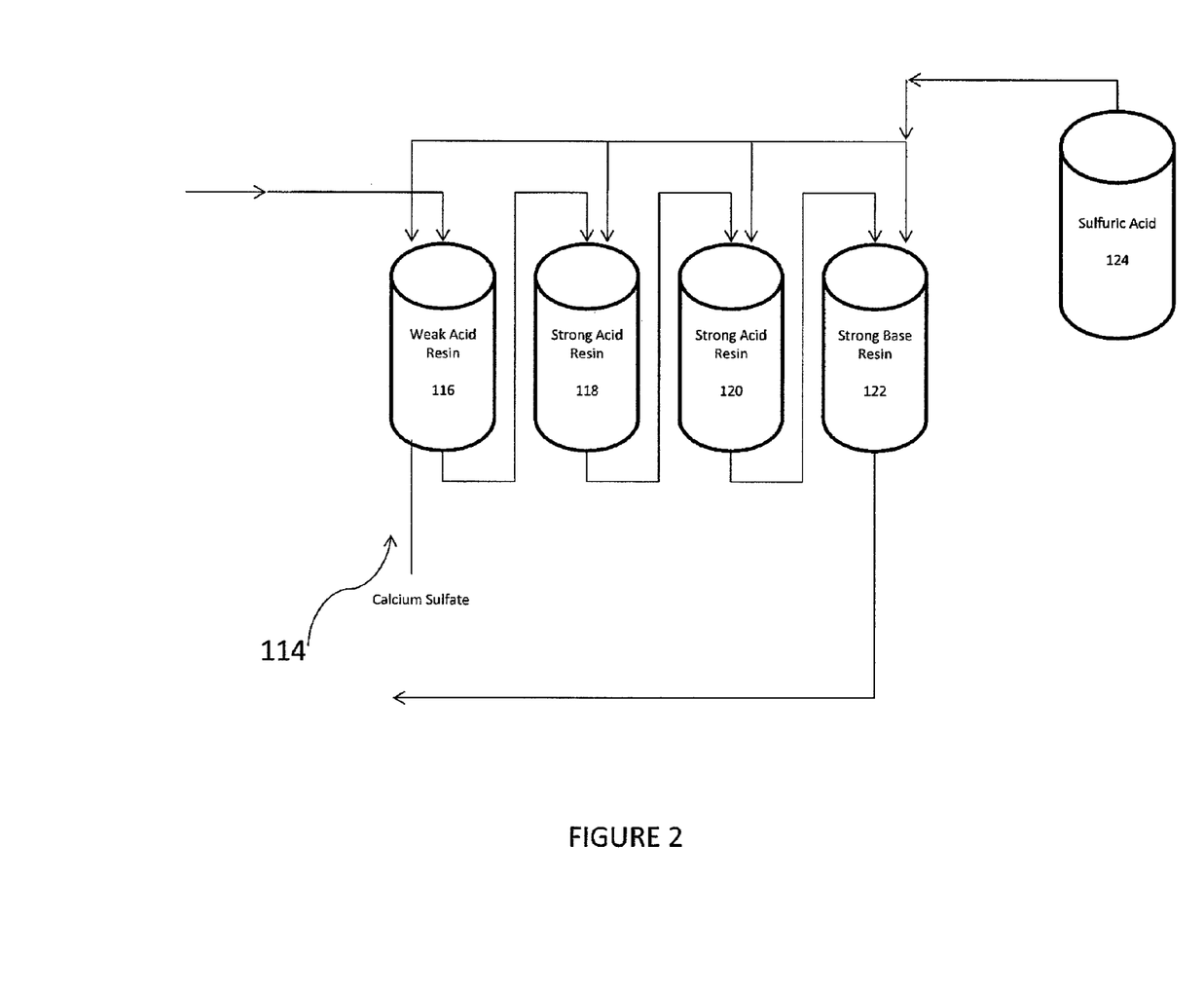
FIG. 2 schematically illustrates a set of ion exchangers 200 according to one preferred embodiment.

FIG. 2 schematically illustrates a set of ion exchangers 114 according to one preferred embodiment. As shown in FIG. 2, the set of ion exchangers 114 has four ion exchange stages or units, each designed to remove specific ions. The first ion exchanger 116 has a weak acid resin bed selected to remove alkaline earth ions such as $Ca^{+2}$ from the process water. The weak acid resin preferably has sites with one or more weak acid functional groups, such as carboxylic functional group, acetyl functional group, phosphoric functional group, boracic functional group. The second and third ion exchangers 118, 120 each have a strong acid resin bed selected to remove alkali ions such as $K^+$ and $Na^+$. Strong acids may have functional groups such as a sulfonic group, perchloric group, hydrobromic group, hydrochloric group, nitric group. The fourth unit 122 can be a strong acid resin to remove $K^+$ and $Na^+$, or can be a strong base resin to remove $SO_4^{2-}$ and $Cl^-$. As further shown in FIG. 2, sulfuric acid 124 is used to back flush or regenerate each resin bed when the resin is saturated. In one embodiment, calcium ion removed in the first ion exchanger 116 is converted to calcium sulfate. The calcium sulfate is then transported to reintroduce calcium ions back to the process water. The inventor has found that addition of calcium to the process water surprisingly enhances the functionality and performance of the final product in a manner to be described in greater detail below.

Figure 3:
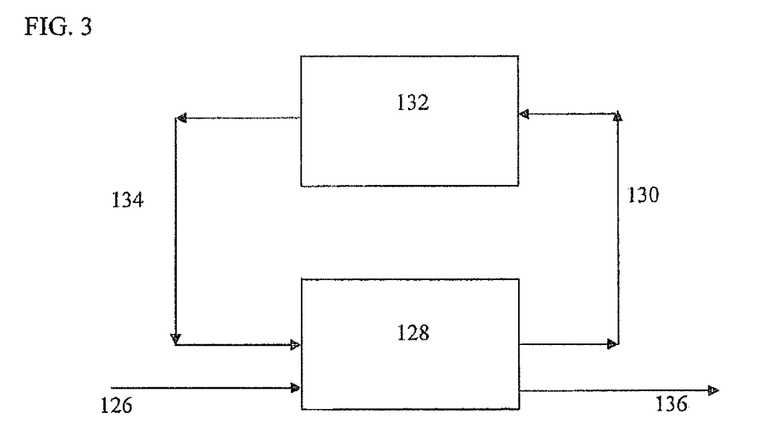
FIG. 3 is a schematic diagram of a cementitious shaped article manufacturing system of another embodiment.

FIG. 3 is a schematic diagram of a cementitious shaped article manufacturing system of another representative embodiment. A formulation 126 enters a typical water based composite forming process at box 128 yielding one or more formed composite articles 136 shaped in any of a number of shapes as desired. Water used with water forming process 128 exits as alkali process water 130 and is fed into an alkali removal process at box 132. The alkali removal process may be an ion exchange process or any other process designed to remove alkali content from the water. After processing at box 132, water exits the alkali removal process as water 134 having reduced amount of alkali and is available for reentering the water based composite forming process at box 128. Process water 130 exiting box 128 may do so at one or more exit ports. Similarly, box 132 may have one or more exit ports for the outflow of water 134. Moreover, water 134 entering box 128 may enter via one or more entry ports. Multiple entry and exit ports will allow flow water when desired to be regenerated in process to maximize efficiency of the system. In addition, water may be tested at one or more exit ports to ensure alkali content is at a desired level. Generally, water leaving the one or more exit ports from box 132 will return to box 128. However, some water may be re-used in another portion of the system. Under the design shown in FIG. 3, water may be recycled in a completely closed-loop system or a partially closed loop system. When one or more water based forming processes 128 are in operation, each may have one or more exit ports that diverge to the same alkali removal process box 132. In one form, process water from the forming process 128 is passed through a multi-stage alkali removal process. This alkali removal process prevents build up of alkali ion, such as sodium or potassium, in the closed-loop system.

Figure 4:
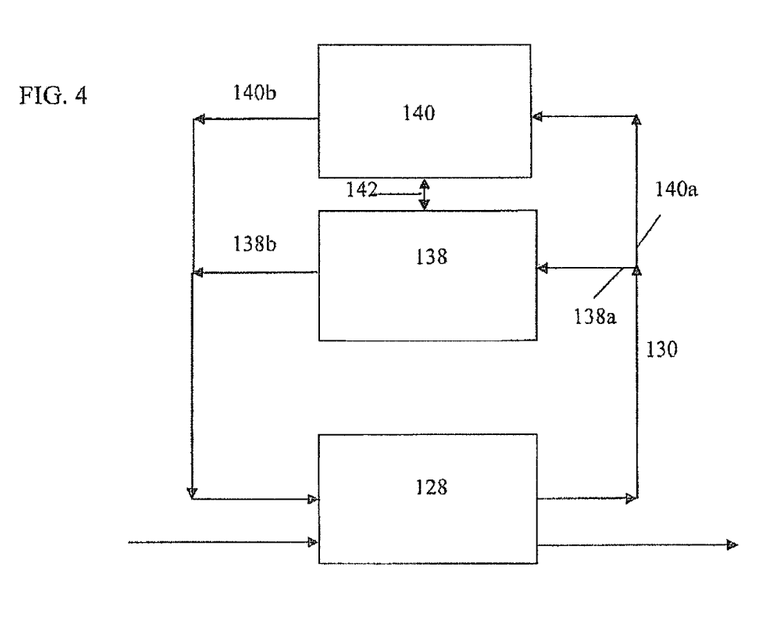
FIG. 4 is a schematic diagram of a cementitious shaped article manufacturing system of yet another embodiment.

In some embodiments, the multistage alkali removal system is made up of more than one alkali removal sets designed to operate in parallel or in series in the event that one of the sets requires maintenance, cleaning, testing, and the like. An example is depicted in FIG. 4, in which box 138 and 140 are both alkali removal sets, each having a shut-off valve at 138a and 140a, respectively. Either one or both shut-off valves may be open allowing alkali water to flow to either one or both alkali removal processes. Removal set 138 and removal set 140 may further include one or more flow ports depicted at 142 that allow some or all of the water from one removal set to pass to the other removal set allowing for even further ion removal. For example, some or all of water from removal set 138 may exit via 142 to removal set 140 and after alkali processing will exit removal set 140 via exit port 140b to then return to box 128. Should only a portion of the water be shunted via 142, the remainder will exit via exit port 140b. Generally, water from exit port 140b will return to box 128. However, some water may be re-used in another portion of the system. Similarly, some or all of water that enters removal set 138 may exit via 142 to removal set 140 and exit removal set 140 via exit port 140b to then returns to box 128.

Figure 5:
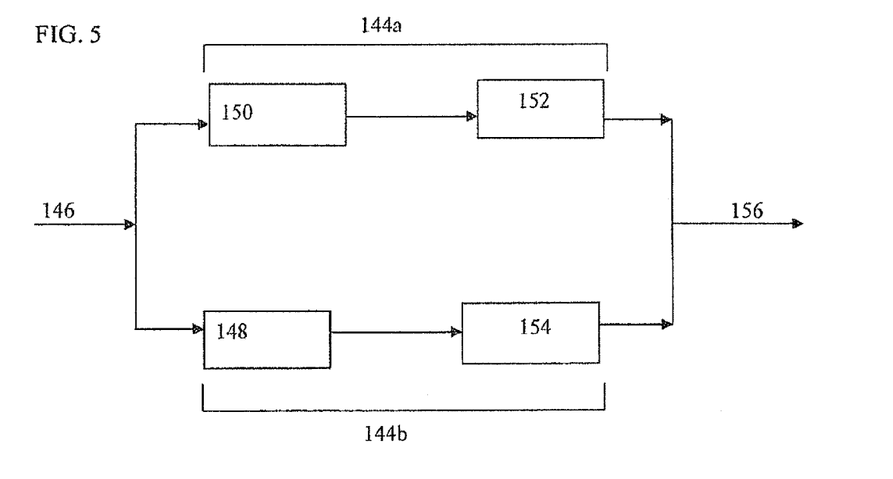
FIG. 5 is a schematic diagram of a cementitious shaped article manufacturing system of yet another embodiment.
Figure 6:
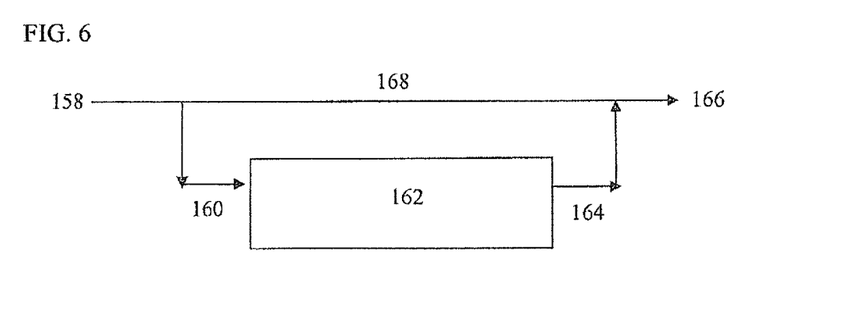
FIG. 6 is a schematic diagram of a cementitious shaped article manufacturing system of yet another embodiment.

Another example is shown in FIG. 5, which depicts two multi-stage exchangers, 144a and 144b, operating in parallel. Process water 146 may enter multi-stage exchanger 144a when exchanger 144b is off-line, generally via shut-off valves placed between 146 and 148. Similarly, process water 146 may enter multi-stage exchanger 144b when exchanger 144a is off-line, generally via shut-off valves placed between 146 and 150. Exchanger 144a includes at least two exchangers, at least one weak acid exchanger 150 and at least one strong acid exchanger 152. Similarly, exchanger 144b includes at least two exchangers, at least one weak acid exchanger 148 and at least one strong acid exchanger 154. After water flows through one or more exchangers, the output water 156 exiting the one or more exchangers will have less alkali ions and will be able to be recycled back to the forming process for continuous manufacturing of composite articles. Optionally, some or all of the water may by-pass the alkali removal process. This is depicted schematically in FIG. 6. For example, a portion of water 158 may be diverted through port 160 into exchanger 162, exiting the exchanger at 164. Water 158 may be clean or untreated water and may become recombined with less alkali water as water 166.

Figure 7:
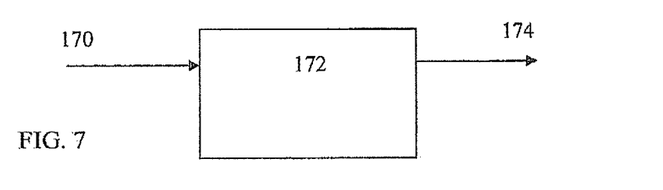
FIG. 7 is a schematic diagram of a cementitious shaped article manufacturing system of yet another embodiment.

Alkali water passing through an activated exchanger leads to the formation of salt on the active sites of the resin beds. Over time, as the amount of salt accumulates, the number of active sites is reduced, the efficiency of the resin bed is adversely affected. A resin bed is regenerated or reactivated by acidification of the resin. Generally, this involves taking the exchanger off-line and introducing acids to the exchanger. Reactivation occurs generally as depicted in FIG. 7 in which an acid 170 is introduced into the flow line and is run through exchanger 172 while it is shut off from the process water line. Activation by an acid on a used resin leads to the discharge of salts from the resin bed and the replacement of acidic functional groups on active sites of the resin. The discharge fluid 174 exiting exchanger 172 after acidification is a saline solution that may either be re-used in another portion of the system, in an alternative system or discharged as a weak salt without requiring further processing. Suitable acids for regeneration of the weak or strong acid resin beds include nitric acid, hydrochloric acid, fluoroantimonic acid, carborane, triflic acid, as examples. Other acids for regenerating weak acid resin bed include but are not limited to acetic acid, citric acid, boric acid, phosphoric acid, or hydrofluoric acid. Acid concentrations may range from about 0.05M to about 0.5M. The general range of times for regeneration is typically from 1 hour to 10 hours.

Typically in use and as described herein, more than one alkali removal process is placed in parallel so that at least one is in operation while another is taken off line when reactivation is required. This allows the overall manufacturing system of composite articles to operate in a continuous fashion without interruption, thus reducing waste and efficiency due to start-up and shut-down times. In operation, the same acid may be used to regenerate exchangers with either the strong acid or weak acid resin beds.

It has been found unexpectedly that articles formed from the system described herein have improved characteristics as compared with alternative articles made from a water recycling process that lack an alkali removal step. For example, articles described herein generally exhibit an improvement in the modulus of rupture at saturation (MOR) of about 10%, to 30% as compared with the same article made from a system that lacks an alkali removal process. In addition, articles prepared via manufacturing processes described herein will exhibit a MOR of greater than about 8 MPa, or greater than about 8.5 MPa, or greater than about 9 MPa, or greater than about 9.5 MPa, or greater than about 10 MPa. Articles prepared via manufacturing systems described herein will exhibit an improvement in a tensile strength from about 10%, or about 20%, or about 30% as compared with the same article made from a system that lacks an alkali removal process.

Articles described in certain preferred embodiments are generally cementitious and comprise a hydraulic binder, at least one silica source, and one or more fiber sources for reinforcement. Formulations may further comprise one or more additives such as one or more density modifiers, water repelling or hydrophobic additives, and/or biocides. The article surfaces may be further finished using methods, such as sanding, brushing, sand-blasting, stamping, embossing, machining and the like. The article may be air cured, cured in an autoclave, or using virtually any known or available curing method or system. The article may be treated with one or more coating treatments. The article may also be cut into other shapes and sizes.

Articles prepared via manufacturing system described herein are less affected by moisture damage, especially under freeze-thaw performance, as compared with the same article made from a system that lacks an alkali removal process. Thus, such articles provided as described herein retain their thickness and shape better than articles made from conventional water-based manufacturing method that recycles water but does not include an alkali removal process. Articles prepared as described herein will last about 10 cycles longer, or about 15 cycles longer, or about 20 cycles longer than articles made from a similar system that does not include alkali removal as described herein. Performance parameters, such as MOR, MOE, and moisture movement, moisture content and freeze-thaw performance, are characterized by ASTM C1185, ASTM C1186 and ASTM D1037, respectively.

Articles described are manufactured using any water-based manufacturing system and, thus, may be formed as a panel or sheet and may be further configured for use in exterior or interior applications. As a panel or sheet, an article described herein is generally defined by at least two generally planar faces that are exterior surfaces. An article described herein also has one or more perimeter edges generally defined as an exterior surface having a surface area less than the smallest face or less than the smaller edge. Additional configurations for articles described herein, include but are not limited to a fence, tile underlayment, siding, trim, fascia board, roofing tile, decking, and the like, as examples. The system described herein do not limit the type of article that is manufactured and unexpectedly conserves resources as well as provides a mechanically better building article than what is provided by comparative systems that have tried to conserve resources but do not include an alkali removal process as described herein. The systems described herein do provide for a cementitious article having a low alkali content. Articles may be further shaped and sized or cut into desired shapes and sizes.

Article surfaces may be substantially flat having a smooth texture and/or a rough texture. In some embodiments, the texture on one or more surfaces may include an artistic design, such as a name and/or a specific marking that is uniform or random. In some embodiments, a surface may imitate a known texture, such as wood grain or stone appearance. In addition or as an alternative, one or more surfaces of an article may have one or more portions that protrude outwards or inflect inwards. The protruded or inflected portions may include a functional portion or may serve as a design feature, or combinations thereof. Examples of such surfaces are a key line, a bead, and a groove.

The thickness of articles described herein, measured as the shortest distance between two surfaces, may be less than about 50 mm. In some embodiments, the thickness may be less than about 35 mm, or less than about 25 mm. In some embodiments, the thickness is less than about 6 mm. Such thinner building products, such as panels or sidings, allow for the same area of coverage with a reduced amount of raw materials. In some embodiments, the thickness may vary across the article in view of various protrusions, inflections and/or hollowed and/or grooved regions. Some embodiments or applications provide for thicker articles. The thickness maybe more than about 35 mm, or more than about 40 mm, or more than about 45 mm. Such thicker building products may provide stronger and more architecturally appealing products where desired.

When an article described herein is configured as a long sheet or panel, the length of the panel is the longest distance between two points on the same surface of all exterior surfaces. Often such articles are greater than about 3.5 meters (m) in length. In some embodiments, the length may be greater than about 5 m, or greater than about 6 m. It has been found that longer building products, especially trim, decking or fascia, may allow for quicker installation and will have fewer joints between consecutive pieces, which aids in installation.

In some embodiments, the articles described are configured as a narrow sheet or panel. The width of the panel, measured as a distance between edges, is in some embodiments less than about 360 mm. The width may also be less than about 160 mm or less than about 100 mm.

Figure 8:
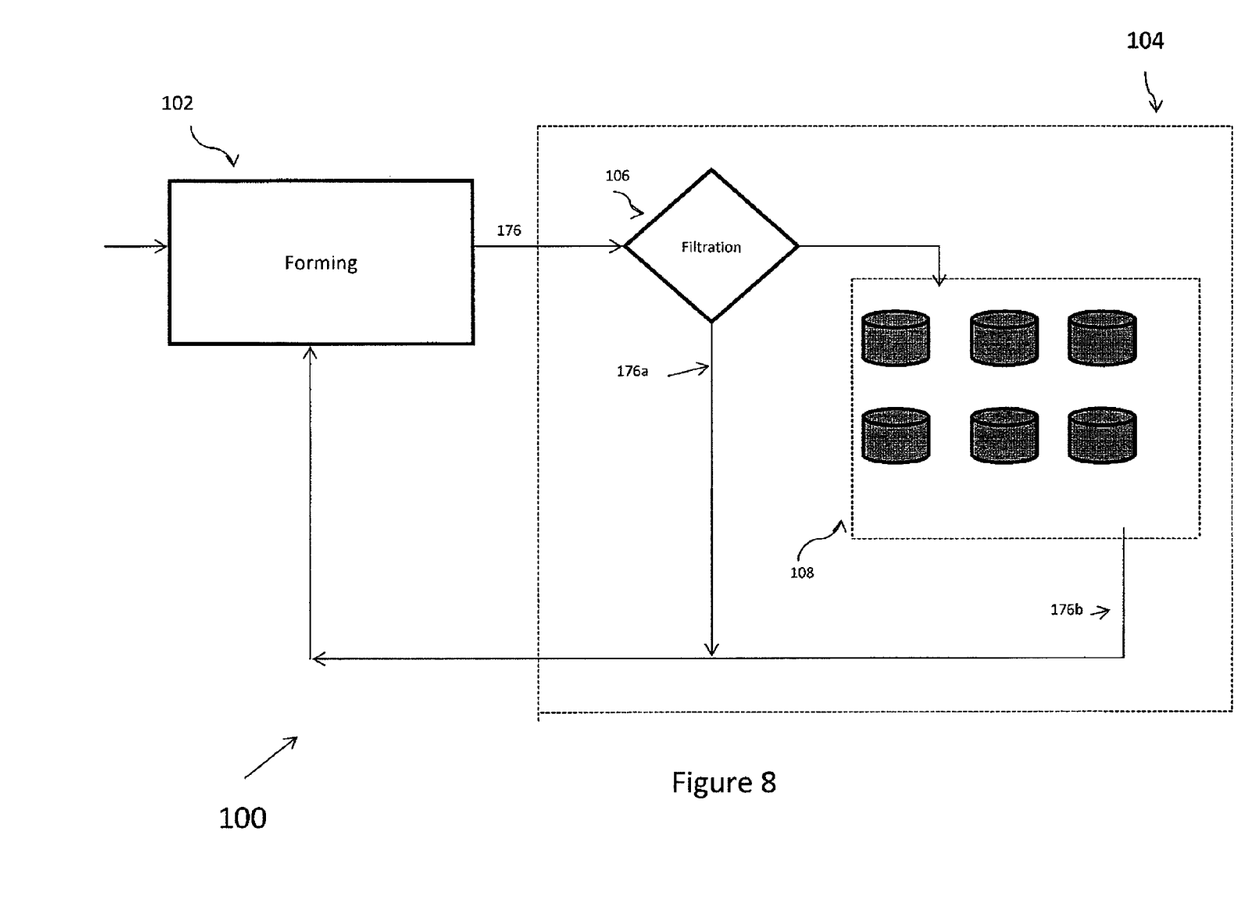
FIG. 8 is a schematic diagram of a cementitious shaped article manufacturing system of yet another embodiment.

One of the challenges in incorporating an ion exchange system in a commercial fiber cement manufacturing process to treat and recirculate spent process water is designing a system that can handle the large volume of process water with complicated chemical composition. FIG. 8 shows the flow diagram of a fiber cement manufacturing process of a preferred embodiment which successfully incorporates an ion exchange system to treat the spent process water by dividing the water into separate process streams and controlling the flow rate of each stream.

As shown in FIG. 8, the process water exiting the forming unit 102 is divided into a recycle stream 176 and a waste stream 178. Water in the recycle stream 176 is directed to the multistage alkali removal system 104. The recycle stream 176 is first directed to the filtration process 106, which be a single process before the parallel alkali removal steps 108, or a filtration process in each of the parallel alkali removal sets, or a combination thereof.

After completing the filtration process 106, a first portion 176a of the recycle stream is recirculated back to the forming unit 102 while a second portion 176b is recycled through the alkali removal process 108 for alkali removal treatment before entering back into the forming unit 102. With the arrangement of multiple parallel alkali removal sets, not all of the sets are in operation at any time, thus leaving at least one set in a stand-by mode. The ion exchange units collect the alkali ion from the process water, and thus over time will gradually become saturated and needs to be taken offline for cleaned out or regenerate. The stand-by set is then put back on-line, with the process water redirected through it for treatment.

The treated recycled stream 176b may have a flow rate of 5 to 100% of the total process water flow rate. The waste stream 178 of the process water exiting the forming process can range from 0 to 95% of the process water flow rate. The first portion 176a of the recycled stream ranges from about 2% to 70% of the total process water flow rate and may be recycled directly back to the process without going through the alkali removal treatment. In one embodiment, water exits the forming process at a flow rate of about 8,000 to 150,000 gallons per hour, more preferably at about 50,000 gallons per hour. In another embodiment, the recycle stream enters the alkali removal sets at a flow rate of about 4800 to 100,000 gallons per hour, more preferably at about 30,000 gallons per hour. In yet another embodiment, the portion of recycle stream that is recycled back to the forming process without being treated in the alkali removal process has a flow rate of about 1600 to 150,000 gallons per hour, more preferably at about 10,000 gallons per hour.

When one of the parallel ion exchange sets is offline for cleaning, the resin bed in each ion exchange unit may be regenerated by back flush by an acid solution to restore the acid functional group sites on the resin bed. The acid solution in some embodiments is selected to have at least one functional group of carboxylic group, acetyl group, phosphoric group, sulfonic group, perchloric group, hydrobromic group, hydrochloric group, nitric group or combination thereof. The ion exchange units that are designed to remove monovalent ions are referred herein as to have a strong acid resin bed. The molar concentration of the acid solution for strong acid resin bed may be 0.3 to 0.5M. The ion exchange units that are designed to remove multivalent ions are referred to here as to have a weak acid resin bed. The weak acid resin bed are regenerated by an acid solution with molar concentration of 0.05 to 0.5M. It has been found that the acid functional groups on the resin beds can be restored within 1 to 10 hours of continuous back-flushing.

Figure 9:
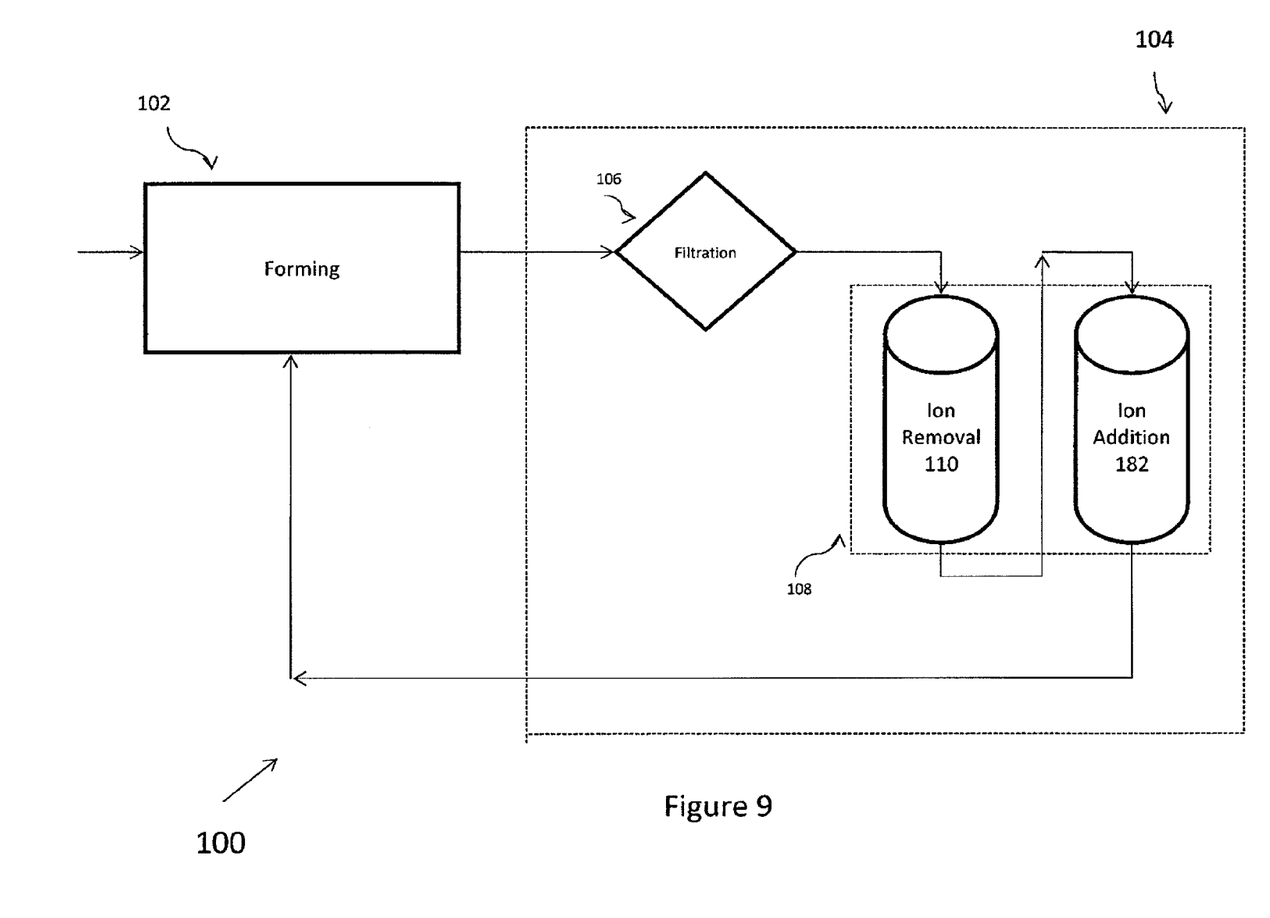
FIG. 9 schematically illustrates an embodiment of a multistage alkali removal system which includes an ion addition step.

FIG. 9 illustrates another implementation of the multistage alkali removal system 182 which preferably includes an ion addition step 194. In some embodiments, ions are first removed using a series of ion exchanger units 110 that are configured in a sequential order such that through the ion removal step, multivalent ions, such as $Ca^{+2}$, are removed before monovalent ions, such as $K^+$ and $Na^+$. Subsequent to the removal of these ions, certain multivalent ions such as $Ca^{+2}$ are then added back to the process water in the ion addition step 194 before it is reused in the forming process. The multivalent ions are first removed in order to facilitate removal of the monovalent ions, otherwise the multivalent ions will likely saturate the resin bed and prevent effective removal of the monovalent ions.

The alkali removal system generally operates by stoichiometric and chemically reversible reactions between alkali ions in the spent process water and acidic ions within the ion exchanger units which form a salt. The ion exchanger units comprise one or more synthetic resins placed in series or in parallel to which acidic ions are bound on the active sites of the resin. Synthetic resins include cation exchange resins for removal of alkali cations and may also include anion exchange resins for removal of one or more anions. Examples of suitable synthetic resins include but are not limited to polystyrenic gel, polystyrene cross-linked with divinylbenzene, or long chain polymeric beads with carboxylic or sulfuric acid functional groups. In some embodiments, each set of ion exchangers may include at least one exchanger having a weak acid functional group and at least one exchanger having a strong acid functional group.

Figure 10:
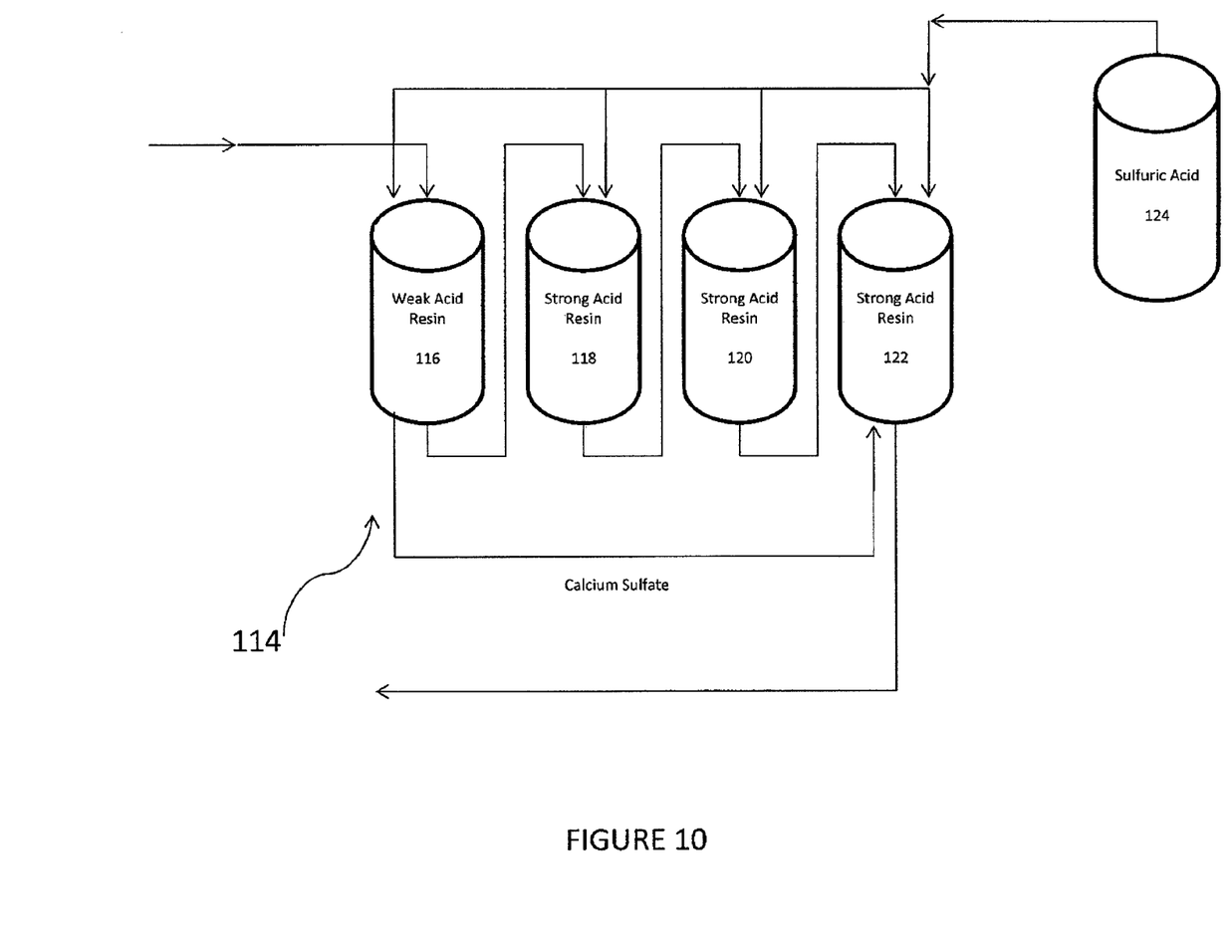
FIG. 10 schematically illustrates an embodiment of a set of ion exchangers which includes an ion addition step.

As shown in FIG. 10, the set of ion exchangers 114 can have four ion exchange stages or units, each designed to remove specific alkali ions. The first ion exchanger 116 has a weak acid resin bed selected to remove alkaline earth ions such as $Ca^{+2}$ from the process water. The weak acid resin preferably has sites with one or more weak acid functional groups, such as carboxylic functional group, acetyl functional group, phosphoric functional group, boracic functional group. The second, third, and fourth ion exchangers 118, 120, 122 each have a strong acid resin bed selected to remove alkali ions such as $K^+$ and $Na^+$. Strong acids may have functional groups such as a sulfonic group, perchloric group, hydrobromic group, hydrochloric group, nitric group. As further shown in FIG. 2, sulfuric acid 124 is used to back flush or regenerate each resin bed when the resin is saturated with salt. In one embodiment, calcium ion removed in the first ion exchanger 116 is converted to calcium sulfate. The calcium sulfate is then transported to the fourth ion exchanger 122 to reintroduce calcium ions back to the process water. The inventor has found that addition of calcium to the process water surprisingly enhances the functionality of the final product.

Following is an example of products manufactured using the system described in FIG. 8. In the forming process, raw materials were mixed in a mixing vat, such as that in a Hatcheck machine. A slurry was made by combining 4440 lb/h of ordinary Portland cement, 12000 lb/h of cellulose fiber, 63000 lb/h of ground silica, 150 lb/h of anionic polyacrylamide and 60,000 gallons/h of fresh water. The slurry was introduced into the bottom of four slurry vats in the Hatschek machine. A running felt collected solid matter and some water depositing thin layers of slurry onto a formation cylinder. Multiple layers were accumulated on the formation cylinder until an overall material thickness was achieved. In this example, the thickness was about 127 mm; however thicknesses, as described earlier, may readily be varied with said forming process and machine. The layered material was cut at periodically to create articles at a desired length. The layered material was then transferred to a take-off conveyor, at which point the layered material left the forming process.

Water from the slurry vats in the Hatschek machine had a flow rate of about 50,000 gallons/h. The water, also referred to as over-flow process water, had a steady state alkali level of about 1300 ppm. This flow rate may be adjusted and may range from about 8,000 gal to 150,000 gal. The overflow process water was divided into at least three streams. A first stream having a flow rate of about 30,000 gallon/h was directed to an alkali removal process. This flow rate may be adjusted and may range from 4,800 gal to 100,000 gal. A second stream having a flow rate of about 10,000 gallon/h was combined with output from the alkali removal process prior to reentry back into the forming process. This flow rate may be adjusted and may range from 1,600 gal to 150,000 gal. A third stream having a flow rate of about 10,000 gallon/h was discharged from the process. This flow rate may be adjusted and may range from 1,600 gal to 150,000. Of course flow rates, as described, are adjustable and may be altered as desired. Adjustment of flows rates would be understood and could be performed by one of ordinary skill in the art.

In the alkali removal process, solid particles greater than 5 mm were removed from the first stream using a solid-liquid separator. A solid liquid separator used in this example was a series of cartridge filters. However, alternative separators may be implemented without undue experimentation. The stream was then directed to a set of six alkali resin beds. The six resin beds include two parallel sets of three beds in series. One set is sufficient to treat the water stream and often only one set may be in operation at a time. After every 8 hours of operation, the set of resin beds that were in use were subjected to regeneration, hence taken off-line, while the process water stream was redirected to the second parallel set. In each set of three resin beds in series, the first bed includes resin with weak acid functional groups on its active sites which included a carboxylic acid functional group, the second and third beds had a strong acid functional groups on its active sites that included a sulfonic acid functional group. When in operation, the alkali ions in the process water stream reacted with the acid functional group in each of the resin beds and formed salts on the active site, leaving the process water exiting the set of resin beds substantially free of alkali ions. Once the process water was treated the treated water stream was combined with the second stream described previously and recycled back to the bottom of the slurry vats in the forming process.

For regeneration of the resin beds, the weak acid resin bed was subjected to a flow of sulfuric acid at a concentration of about 0.7% at a flow rate of about 2500 gallon/h for about 2 hours. The strong acid resin beds were each subjected to a flow of sulfuric acid at a concentration of about 7% at a flow rate of about 230 gallon/h for about 2 hours. Ranges of concentration and flow acid may vary as desired from about 0.5% in the first resin bed to up to 40% in the second resin bed. Examples include about 0.5% concentration in the weak acid bed followed by about 8% in the strong acid bed or about 5% in the weak acid bed followed by about 11% in the strong acid bed or about 4% in the weak acid bed followed by about in the strong acid bed 12%. With increasing acid strength (e.g., concentration), regeneration will typically be of a shorter duration. Adjustment of flows rates and acid concentration would be understood and could be performed by one of ordinary skill in the art. During regeneration, acid functional groups replace the salt affixed to the resin beds. The discharge solution after regeneration is a relatively weak salt solution, an example of which includes calcium sulfate in the example described above, which may be reused separately for one or a number of purposes.

The layered material formed from the forming process was further embossed with a decorative pattern by a roller, pressing on the material with a pressure of about 110 Psi. The material was autoclaved at a saturated temperature of greater than 180° C. for about 12 hours. The material was then tested according to ASTM methods disclosed previously and had an MOR of 10.2 MPa.

In a comparative system, a forming process described above operated in the absence of an alkali removal process. Here, first and second water streams from the overflow process water were combined and recycled directly back to the bottom of the slurry vats. It was found that the alkali concentration in the process water continued to rise over time. After 6 hour of operation, the alkali level had reached 3600 ppm. The product produced at this point was tested as described above according to ASTM methods and found to have an MOR of 7.6 MPa, significantly lower than that of the product sample formed when an alkali removal process was in cooperation with the forming process.

The TABLE outlines some quantitative differences in product performance of articles prepared by either the systems described herein or an alternative system that does not include an alkali removal process as described herein.

TABLE

Representative properties of formed samples.

|  | With alkali removal | Without alkali removal |
| --- | --- | --- |
| MOR (MPa) according to ASTM 1186 | 10.2 | 7.6 |
| Tensile strength (MPa) according to ASTM 1186 | 2.17 | 1.35 |
| Tensile strength at 20 freeze-thaw cycles according to ASTM D1037 (MPa) | 1.33 | 1.06 |

Although the foregoing description of certain preferred embodiments has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Consequently, the scope of the invention should not be limited to the foregoing discussions.

What is claimed is:

1. A method of recycling spent process water from a cementitious shaped article forming process comprising:
   removing calcium, sodium, and potassium ions from the spent process water to provide a process water with a reduced metal ion content, wherein calcium ions are first removed before sodium and potassium ions are removed from the spent process water;
   converting calcium to a calcium salt:
   adding calcium from the calcium salt to the process water to produce a calcium enriched process water with a reduced potassium and sodium ion content; and
   reintroducing at least a portion of the calcium enriched process water with a reduced metal ion content into the cementitious shaped article forming process.

2. The method of claim 1, wherein the calcium, sodium, and potassium ions are removed from the process water by an ion exchange process.

3. The method of claim 2, wherein the ion exchange process comprises a first ion exchange resin having a weak acid functional group and a second ion exchange resin having a strong acid functional group.

4. The method of claim 3, wherein the weak acid functional group is —COOH.

5. The method of claim 3, wherein the strong acid functional group is —SO$_3$H.

6. The method of claim 1, further comprising removing chromium ions from the process water.

7. The method of claim 1, wherein the calcium salt comprises calcium sulfate.

8. The method of claim 1, wherein the calcium from the calcium salt is added to the process water via an ion exchange process.

9. The method of claim 1, wherein the calcium salt is transported to an ion exchanger and the process water is moved through the ion exchanger.

* * * * *